Figure 1:
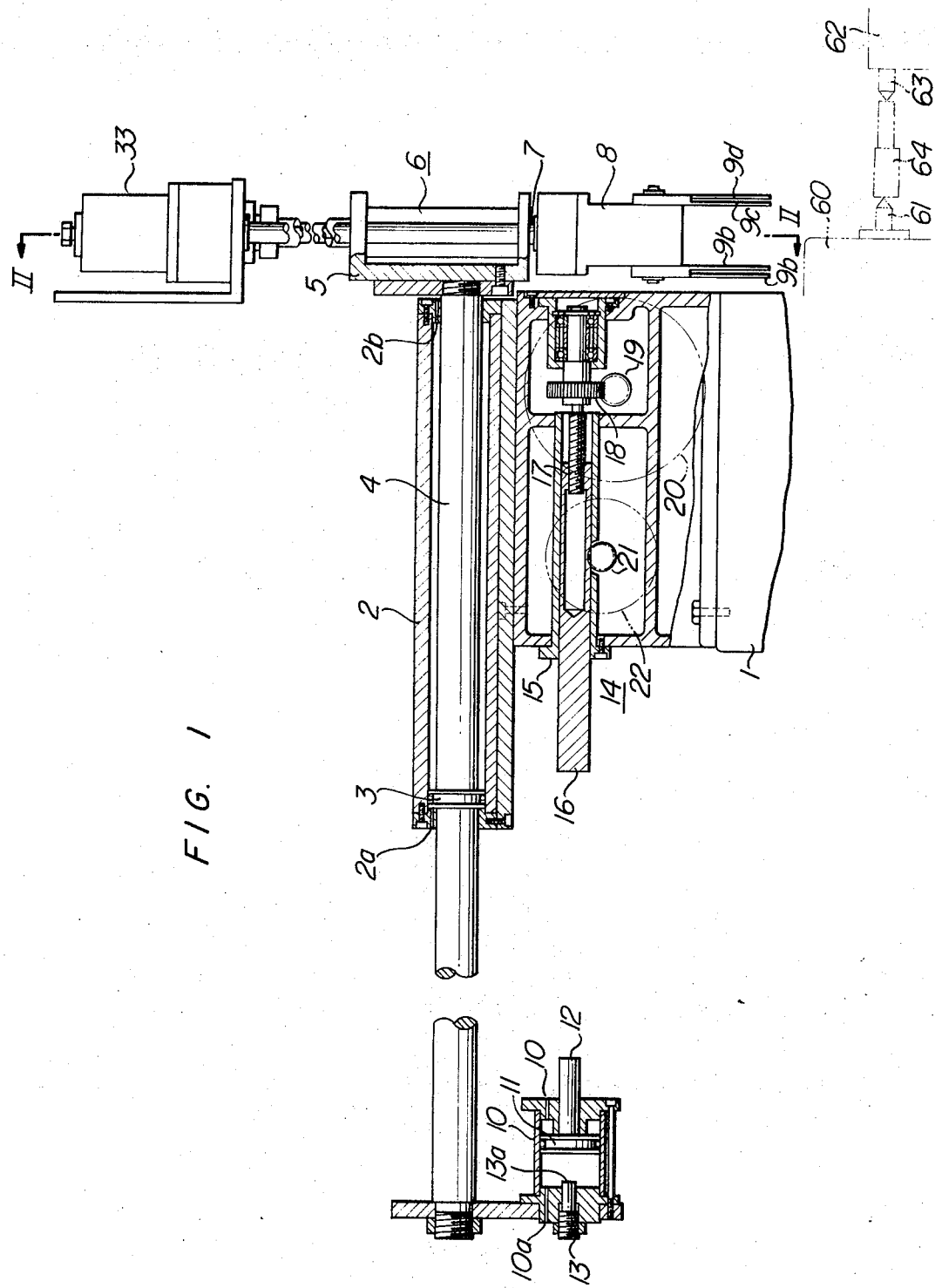

United States Patent [19]
Iwata

[11] 3,765,545
[45] Oct. 16, 1973

[54] LOADER WITH REVERSING MEANS
[75] Inventor: Masaharu Iwata, Bisai-shi, Japan
[73] Assignee: Okuma Machinery Works Ltd., Nagoya-shi, Japan
[22] Filed: Sept. 18, 1972
[21] Appl. No.: 290,189

[30] Foreign Application Priority Data
Nov. 12, 1971 Japan.............................. 46/106379

[52] U.S. Cl. ................ 214/1 BB, 214/1 BC, 82/2.5
[51] Int. Cl. ............................................... B25j 9/00
[58] Field of Search .............................. 82/2.5, 2.7; 214/1 BB, 1 BC

[56] References Cited
UNITED STATES PATENTS
| | | | |
|---|---|---|---|
| 2,040,028 | 5/1936 | Smith et al. | 82/2.5 |
| 1,903,916 | 4/1933 | Stenhouse et al. | 214/1 BB |
| 3,476,266 | 11/1969 | Devol | 214/1 BB |

Primary Examiner—Leonidas Vlachos
Attorney—S. Delvalle Goldsmith et al.

[57] ABSTRACT

A loader having means for gripping a material processed in a lathe and the like and reversing the direction of the material so that the different portion of the material may be processed by the lathe.

7 Claims, 4 Drawing Figures

LOADER WITH REVERSING MEANS

This invention relates to a loader having means for holding a material to be processed and reversing the position thereof, and more particularly to a loader having means for gripping a material processed in a lathe and the like and reversing the direction of the material so that the different portion of the material may be processed by the lathe.

In processing a material in a lathe and the like, the material is first processed at a portion thereof and then reversed of its direction so that the rest portion thereof may be processed in the same lathe at the same position. The reversal of the material has been conducted in the art by use of a gripper which holds the central portion of the material and reverses the direction thereof. The device for reversing the material, however, has not been used efficiently mainly due to difficulties in adjustment and replacement of various parts thereof for handling various size and shape of materials to be processed. For instance, the position of the gripper fingers, the shape of the gripper fingers and the position of the center of gripping of the gripper have had to be adjusted or changed when the material to be processed is changed.

The primary object of the present invention is to provide a loader which has a reversing means adapted to be used for any types of materials.

Another object of the present invention is to provide a loader with a reversing means in which the interference between the material to be processed and a chuck is prevented when the material is reversed.

Still another object of the present invention is to provide a loader with a reversing means in which a control for making the length of insertion of the material to be processed into the chuck is simplified.

A further object of the present invention is to provide a loader with a reversing means which can even grip a material to be processed having a stepped portion connecting a different diameter part thereof.

A still further object of the present invention is to provide a loader with a reversing means which can be effectively used with a numerical control machine tool and highly improves the productivity.

Figure 2:
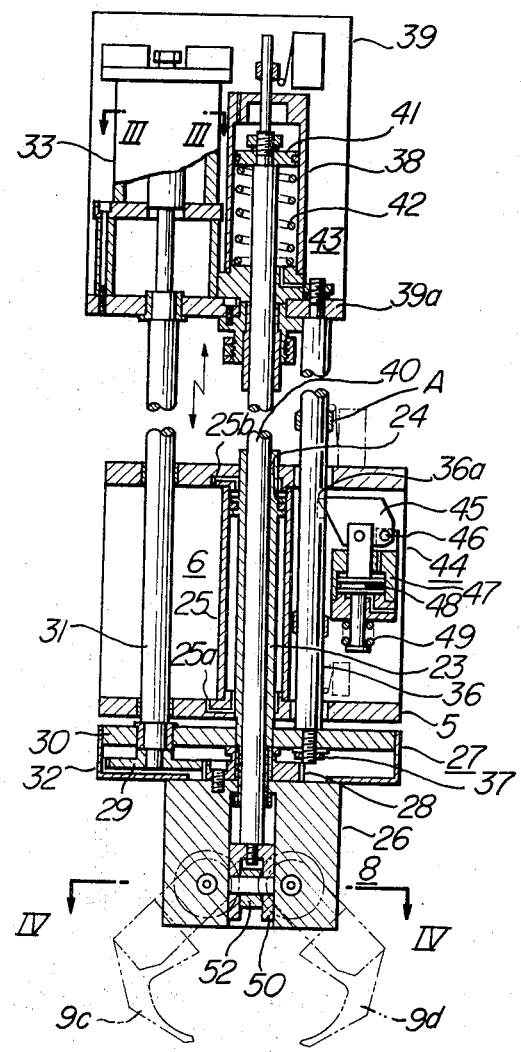
Figure 3:
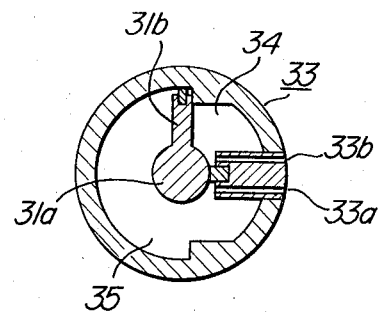
Figure 4:
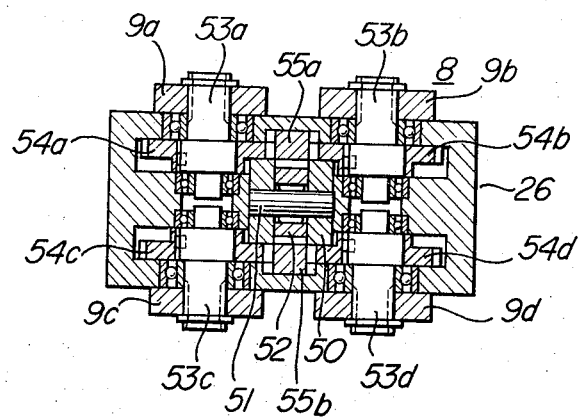

Other objects, features and advantages of the present invention will be made apparent from the following detailed description of a preferred embodiment thereof taken in conjunction with the accompanying drawing in which:

FIG. 1 is a front elevational view partly in section of an embodiment of the loader in accordance with the present invention, FIG. 2 is a sectional view taken along the line 2 — 2 in FIG. 1, FIG. 3 is a sectional view taken along the line 3—3 in FIG. 2, and FIG. 4 is a sectional view of a part of the loader taken along the line 4 — 4 in FIG. 2.

Now referring to FIG. 1, on the upper portion of a base 1 is fixed an oil pressure cylinder 2 operative for right and left-hand motion. The oil pressure cylinder 2 has a piston 3 integrally fixed to a piston rod or movable portion 4. The movable portion 4 has at the right end thereof an U-shaped frame 5 which is provided with an up-and-down motion oil cylinder 6 having at the movable portion 7 thereof or a piston rod a differential device 8 connected with gripper fingers 9a to 9d.

The oil pressure cylinder 2 is provided at the left end of the piston rod 4 thereof with an oil pressure cylinder 10 working as a hydraulic pressure working device which has a piston 11 having a larger cross section (diameter) than that of the piston 3 of said right and left-motion hydraulic pressure working device (oil pressure cylinder) 2. The piston rod 12 of the piston 11 works for feeding in and out an element. The reference numeral 13 indicates a rear screw screwed into the left end of the hydraulic pressure working device 10 which serves as a limit stopper when the piston 11 is moved leftward. The base 1 is provided with a stopper portion 14 which controls the position of the right end 12 of the piston rod 11. The stopper portion 14 consists of a position regulating stopper 16 which slides within a guide 15 fixed to a base 1, a feed screw 17 screwed in a female screw of said position regulating stopper 16, a position control motor 20 rotating the feed screw 17 by way of a gear 18 and a worm 19, and a position detecting switch 22 driven by a pinion 21 meshed with a rack provided on the position regulating stopper 16. As the position detecting switch 22, is used for instance a rotary switch having 50 electric contacts arranged in a circle at equal intervals. The position control motor 20 drives the position regulating stopper 16 until the rotary switch (position detecting switch 22) is rotated up to a position of the electric contact corresponding to the goal position determined by tape instructions given by the numerical control device (not shown).

In FIG. 2, the U-shaped frame 5 is provided at the central portion thereof with a piston rod 23 extending vertically therethrough and slidably supported therby. A piston 24 integrally fixed to the piston rod 23 constitutes an up-and-down feed device 6 together with a cylinder 25 fixed to the frame 5. The piston rod 23 serves as a movable portion 7 of the up and down feed device 6. The piston rod 23 (the movable portion 7) is provided at the lower end thereof with an end portion 26 for mounting a differential device 8. A reversing device 27 which reverses the differential device 8 and a whole gripper is provided between the frame 5 and the end portion 26. The reversing device 27 mainly consists of a gear 28 fixed to the central part of the upper surface of the end portion 26 by means of a screw, another gear 29 meshed with the first gear 28 having the same number of teeth as that of the first gear, a rotatable shaft 31 having the gear 29 at the lower end thereof and rotatably supported by a plate 30, and a cover 32, whereby the end portion 26 is rotated about the piston rod 23 by way of gears 28 and 29 when the rotatable shaft 31 is rotated by a rotary cylinder 33 for reversing the gripper connected with the upper end of the rotatable shaft 31.

The rotary cylinder 33 for reversing the gripper has a construction as shown in FIG. 3, in which a partition 31b integrally formed at the upper end 31a of the rotatable shaft 31 is slidably supported in the cylinder. When a fluid is sent pressurized into an oil chamber 34 of the cylinder 33, the rotatable shaft 31 is rotated by 180° counterclockwise in FIG. 3 and consequently the gripper is rotated by 180°. When a fluid is then sent pressurized into the other oil chamber 35 of the cylinder 33, the rotatable shaft 31 is moved to its original position shown in FIG. 3.

In FIG. 2, the plate 30 of the reversing device 27 is fixed to the lower end of a rod 36 extending through the frame 5 by means of a nut 37. The upper end of the rod 36 supports said rotary cylinder 33 for reversing the gripper and a horizontal portion 39a of an L-shaped frame 39 retaining a cylinder 38 for gripping operation. The piston rod 23 of the up and down feed device 6 is provided with a piston rod 40 sliding up and down through the central part thereof. The lower end of the piston rod 40 is coupled with gripper fingers through a differential device 8 as described hereinbelow and the upper end thereof is provided with a piston 41 fixed thereto for sliding in the cylinder 38 for gripping operation. A spring 42 is a compression spring retained in a lower chamber of the cylinder 38 for gripping operation which normally urges the piston rod 40 upward and consequently urges the gripper to close, and constitutes a gripper finger operating device 43 together with the cyinder 38, piston rod 40 and the piston 41. The reference numeral 44 indicates a stopper for preventing fall of the gripper which is mounted to the U-shaped frame 5 and prevents the rod 36 from falling by means of a stopper member 45 engaged with a notch 36a thereby working to prevent the fall of the gripper. That is, the stopper member is supported so that it may move within a range of angle limited about a shaft 46 fixed to the frame 5 and that the stopper member 45 may be rotated clockwise about the shaft 46 when a fluid is set pressurized into the lower chamber of the cylinder 47 and the piston 48 moves upwards against the force of the spring 49.

The gripper fingers 9a, 9b, 9c and 9d are opened when the piston 41 moves downward in the gripper finger operating device 43 and are closed when the piston 41 moves upward. This motion is effected through the differential device 8 shown in FIGS. 2 and 4. In the drawing, the lower end of the piston rod 40 of the piston 41 is coupled with a slider 50 which is guided slidably in said end portion 26. A shaft 51 extending in perpendicular to the direction of slide of the slider 50 is fixed to the slider and this shaft 51 has a pinion 52 rotatably mounted thereon. The reference numerals 53a, 53b, 53c and 53d indicate pinion shafts supported in said end portion 26 in perpendicular to both the piston rod 40 and the shaft 51 and respectively provided with pinions 54a, 54b, 54c and 54d keyed thereto and with gripper fingers 9a, 9b, 9c and 9d integrally fixed thereto at the end thereof projected out of the end portion 26. The reference numeral 55a shows a rack member slidably guided in the same direction as that of the slider 50 which is provided with racks on the three surfaces thereof to be meshed with said pinions 52, 54a, 54b. The reference numeral 55b shows also a similar rack member provided with racks to be meshed with pinions 52, 54c and 54d. The both rack members 55a and 55b are meshed with the pinion 52 at the opposite sides thereof.

Now the operation of the loader as described above will be described in detail with particular reference to a 180° reversal of a material 64 to be processed inserted between a main shaft 61 of a head stock 60 and a center 63 of a tail stock 62 shown in FIG. 1 according to numerical control by means of tape instructions. Further, it should be noted that the head stock 60 and other elements shown in the right below of FIG. 1 are illustrated in reduced scale in comparison with the whole device of the present invention.

OPERATIONS

When the power switch is turned on first, the pressure source for the hydraulic pressure device is energized and the parts of the device are set as follows;

a. The lower chamber of the up and down motion piston 24 is supplied with a pressure from the passage 25a and the gripper is set at the position as shown in FIGS. 1 and 2.

b. The piston 48 for preventing the fall of the gripper is provided with the pressure at the lower portion thereof and moves upward overcoming the force of the spring 49, and makes the movable end of the stopper member 45 removed from the rod 36.

c. The piston 41 for gripping operation is provided with the pressure at the upper portion thereof and moves downward overcoming the force of the spring 42, whereby the gripper fingers 9a to 9d are opened.

d. Pressure is provided to the oil chamber 35 of the rotary cylinder 33 for reversing the gripper from a passage 33a, and the gripper fingers 9a to 9d are set to be prepared for gripping the material to be processed.

e. The piston 3 for right and left motion is provided at the right side thereof with a pressure from a passsage 2b, and the gripper is set at the left end as shown in FIG. 1.

f. The piston 11 for supplying and taking out the material to be processed is provided at the left side thereof with a pressure from a passage 10a, and the piston 11 is set at the right limit as shown in FIG. 1.

g. The position regulating stopper 16 is controlled by a control device (not shown) to be set at the left limit and already is at the left limit.

2. The position regulating motor 20 is driven, the position regulating stopper 16 moves rightward up to a position instructed by the tape detecting the position with the position detecting switch to determine the position where to grip the material to be processed. Although the gripping position to grip the material 64 to be processed with the gripper is generally so determined that the center of reversal of the gripper (vertical axis of the piston rod 23) is aligned with the center of the material, the center of reversal of the gripper is determined to be biased leftward from the longitudinal center of the material to be processed in advance and then moved to the center so that the opposite ends of the material may be at the same position before and after the reversal thereof in case where the center of reversal can not be brought into alignment with the center of the material due to the shape and size of the material to be processed. Thus, the movement of the gripper for correction is always made rightward which is the same as the direction of movement for position regulation, and accordingly the construction of the controlling means is made simple. Further, the error in the position due to the width of the contact of the position detecting switch and the error due to the backlash of the driving system for the position detecting switch.

3. Then, the left and right motion piston 3 is provided with a pressure at the left side thereof coming from the passage 2a and the piston rod 4 moves rightward. Thus, the piston rod 4 stops at a position where the right end of the rod 12 of the piston 11 abuts on the left end of the stopper 16 to move the gripper to the position to grip the material. At this moment, the piston 11 is retained at its right limit position as shown in the drawing since the piston 11 has a larger area than the piston 3. (The pressure is the same in the both pistons.)

4. The pressure is switched to the upper portion of the up and down motion piston 24 and a fluid flows into the piston from the passage 25b to move the piston rod 23 downward. Thus, the gripper comes down to the position of the center of the material to be processed i.e., the axis of the main shaft 61. 5. The upper pressure of the gripping piston 41 is cut off and the piston rod 40 moves upward by means of a spring 42 to lift the slider 50. At this moment, while the gripper fingers 9a to 9b are not in contact with the material to be processed 64, the racks 55a and 55b meshed with the pinion 52 are lifted at a time since the gripper fingers 9a to 9d do not have resistance. Thus, the pinions 54a, 54b, 54c and 54d are rotated by the same amount to close the fingers. The pinion 52 is not rotated at this time since it is subject the same amount of forces in the opposite directions at two positions apart from each other by 180°. When the piston rod 40 is further lifted and the gripper fingers 9a to 9d are closed to grip the larger diameter part of the material to be processed 64 with the gripper fingers 9a and 9d at first, the pinions 54 a and 54b are prevented from rotating and the rack member 55a stops. Therefore, the force to lift the piston rod 23 of the piston 24 and the slider 50 works to rotate the pinion 52 which is meshed with the rack member 55b. Thus, one of the rack members 55b is rapidly lifted at a double speed to rapidly rotate the pinions 54c and 54d and the gripping fingers 9c and 9d to grip the smaller diameter part of the material to be processed 64. Then, the gripping operation is finished when the gripping forces on the opposite sides of the material is balanced with the force to push up the piston.

6. By cutting off the left side pressure on the piston 11, the gripper is moved rightward until the piston 11 abuts on the right end 13a of the rear screw 13 by the piston 3 to remove the material to be processed 64 from the chuck (center). The length of movement at this can be determined by adjusting the position of the rear screw 13 in advance.

7. In the case where the center of reversal of the gripper is biased leftward from the center of the material to be processed, the position control motor 20 is driven by a control device to move rightward the position regulating stopper 16 up to a position directed by the tape by detecting the position with the position detecting switch 22. Thus, the stopper 16 is moved by a distance double the amount of bias from the center. The piston 3 follows the movement thereof and corrects the position of the material gripped by the gripper to make the positions of the opposite ends of the material be aligned with the positions thereof before and after the reversal.

8. The oil chamber 34 of the rotary cylinder for reversing the gripper is subject to a pressure and the material to be processed is reversed by 180° by the gripper.

9. In the case where the center is biased to the right to the contrary of the case mentioned in the above (7), the position regulating stopper 16 is moved leftward in the same way as mentioned in (7) to correct the position of the material. However, it is not desirable in such a case since a complex control device and a position detecting device are required.

10. By introducing a pressure into the left chamber of the piston 11, the left and right motion piston 3 moves leftward and the material to be processed is fed into the chuck (center).

11. The upper portion of the gripping piston 41 is provided with a pressure and the piston 41 moves down overcoming the force of the spring 42. Thus, the gripper is opened to release the material to be processed.

12. The lower portion of the up and down piston 24 is subject to a pressure and the gripper moves upward up to the position as shown in FIGS. 1 and 2.

13. The pressure is switched to the oil chamber 35 of the rotary cylinder 33 for reversing the up and down motion piston 24 and the gripper is reversed to the original position.

14. The right side of the left and right motion piston 3 is subject to a pressure which has been switched thereto, and the gripper is moved leftward to the left limit. At the time when the gripper is returned to its original position, the position regulating stopper is also moved leftward to the left limit which is the start position of the position detecting switch 22 by means of the position control motor 20. Thus, the gripper is returned to its original position.

Thus, the reversal of the material to be processed gripped by a gripper is automatically conducted according to the instructions from a control device. The operations (2) to (14) are repeated for the material to be processed given in the subsequent process. Although the sequential operations of the device controlled by the control device has not been described with a concrete electric circuit and an oil pressure circuit, it will be understood that the circuit construction can be easily made with reference to general circuits which have been well known in the art.

What is claimed is:

1. A reversing means in a loader which reverses a material to be processed so that the material may be processed of its residual portion when a part thereof has been processed by a processing machine such as a lathe or the like comprising:

at least two pair of gripper fingers,
    a differential means for differentially operating said pairs of gripper fingers,
    a gripper finger operating means for opening and closing said pairs of grippers by way of said differential means,
    a rotating means for rotating said gripper fingers so that the position of the pairs of fingers may be reversed thereby reversing the material to be processed gripped by the fingers,
    a first movable member for horizontally moving said pairs of gripper fingers,
    a second movable member on said first movable member provided with said pairs of gripper fingers, said differential means, said operating means, and said rotating means,
    an up and down feed device for moving up and down said second movable member,
    a fluid pressure working means fixed to a base which horizontally moves said first movable member provided with said up and down feed device, and
    a position regulating means for stopping the horizontal movement of said first movable member and regulating the position of said gripper fingers at a predetermined position.

2. A reversing means in a loader as defined in claim 1 wherein said position regulating means comprises a stop member mounted to an end of the piston rod of said fluid pressure working device, and stopper mounted to said base for stopping the movement of said member.

3. A reversing means in a loader as defined in claim 2 wherein said member mounted to an end of the piston rod is a second piston rod which slides in a cylinder which has a larger cross section than that of said fluid pressure working device and said movable portion is further moved from a first position at which it was position regulated by said stopper to a second position by supplying a pressure fluid into said cylinder.

4. A reversing means in a loader as defined in claim 3 wherein said cylinder is provided at the rear side thereof with a screw for restricting the length of slide of the second piston rod thereby controlling the movement of the movable portion in the horizontal direction when the piston rod of the fluid pressure working device is moved further than the first position where the second piston rod abuts on said stopper to the second position.

5. A reversing means in a laoder as defined in claim 2 further comprising a means for controlling the position of the stopper and a position detecting means wherein the position regulating end of said stopper is made movable, and said stopper is driven by said position controlling means until said position detecting means detects a position corresponding to a terminal position predetermined by instructions from a controlling device.

6. A reversing means in a loader as defined in claim 5 wherein said member mounted to an end of the piston rod is a second piston rod which slides in a cylinder which has a larger cross section that of said fluid pressure working device and said movable portion is further moved from a first position at which it was position regulated by said stopper to a second position by supplying a pressure fluid into said cylinder.

7. A reversing means in a loader as defined in claim 6 wherein said cylinder is provided at the rear side thereof with a screw from restricting the length of slide of the second piston rod thereby controlling the movement of the movable portion in the horizontal direction when the piston rod of the fluid pressure working device is moved further than the first position where the second piston rod abuts on said stopper to the second position.

* * * * *